US012012872B1

(12) United States Patent
Savard et al.

(10) Patent No.: US 12,012,872 B1
(45) Date of Patent: Jun. 18, 2024

(54) SERVICE TUBE LOCKING DEVICE

(71) Applicant: PRATT & WHITNEY CANADA CORP., Longueuil (CA)

(72) Inventors: Philippe Savard, Terrebonne (CA); Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/180,245

(22) Filed: Mar. 8, 2023

(51) Int. Cl.
*F01D 9/06* (2006.01)
*F01D 25/16* (2006.01)
*F01D 25/18* (2006.01)
*F01D 25/24* (2006.01)
*F01D 25/28* (2006.01)

(52) U.S. Cl.
CPC ............ *F01D 9/065* (2013.01); *F01D 25/16* (2013.01); *F01D 25/18* (2013.01); *F01D 25/24* (2013.01); *F01D 25/28* (2013.01); *F05D 2220/323* (2013.01); *F05D 2230/72* (2013.01); *F05D 2250/232* (2013.01); *F05D 2250/63* (2013.01); *F05D 2260/31* (2013.01); *F05D 2260/98* (2013.01)

(58) Field of Classification Search
CPC .......... F01D 25/28; F01D 9/065; F01D 25/16; F01D 25/18; F01D 25/24; F05D 2230/72; F05D 2250/232; F05D 2250/63; F05D 2260/31; F05D 2260/98; F05D 2220/323
USPC ........................................................ 415/144
See application file for complete search history.

(56) References Cited

U.S. PATENT DOCUMENTS

| | | | |
|---|---|---|---|
| 3,469,852 A | 9/1969 | Smith et al. | |
| 5,782,576 A | 7/1998 | Schlemenat et al. | |
| 6,199,453 B1 | 8/2001 | Steinbock | |
| 10,087,847 B2 | 10/2018 | Szymanski | |
| 10,385,710 B2 | 8/2019 | Hendrickson | |
| 11,041,438 B2 | 6/2021 | Agara et al. | |
| 2015/0219015 A1* | 8/2015 | Szymanski | F02C 7/28 415/208.1 |
| 2016/0041356 A1 | 2/2016 | Wang et al. | |
| 2018/0119575 A1* | 5/2018 | Bouiller | F01D 25/18 |
| 2018/0224043 A1 | 8/2018 | Hendrickson | |
| 2018/0333812 A1 | 11/2018 | Miller et al. | |

(Continued)

*Primary Examiner* — Yi-Kai Wang
(74) *Attorney, Agent, or Firm* — NORTON ROSE FULBRIGHT CANADA LLP

(57) ABSTRACT

A service tube assembly, has: a service tube having a threaded end portion and an outer shoulder adjacent to the threaded end portion, the outer shoulder having a frusto-conical shoulder face converging towards the tube axis and away from the threaded end portion; a mating part threadingly engaged by the threaded end portion, the mating part having a seat face converging towards the service tube and towards the threaded end portion; a locking member extending from a first end to a second end, the first end including a notch receiving the outer shoulder, the notch circumscribed by a frustoconical notch face abutting the frustoconical shoulder face to create a frustoconical-to-frustoconical contact surface between the locking member and the outer shoulder, the second end in abutment against the seat face; and a mechanical fastener releasably holding the locking member in abutment against both of the outer shoulder and the mating part.

18 Claims, 5 Drawing Sheets

(56) References Cited

U.S. PATENT DOCUMENTS

2020/0248455 A1    8/2020  Chich et al.
2020/0332931 A1*  10/2020  Marshall ................ F16L 9/003

* cited by examiner

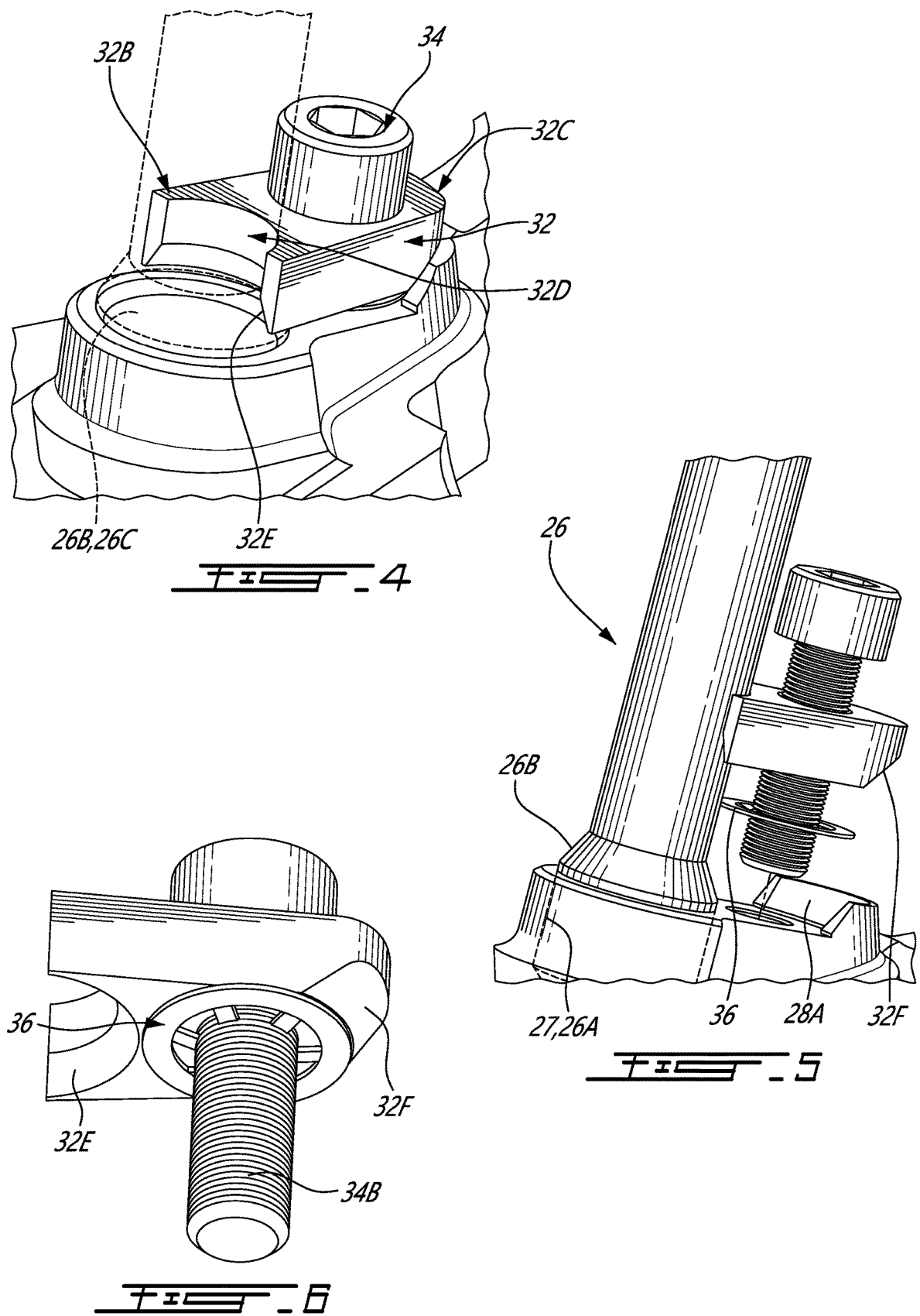

SERVICE TUBE LOCKING DEVICE

TECHNICAL FIELD

The application relates generally to aircraft engines and, more particularly, to service tubes and service tube assemblies used in such engines.

BACKGROUND

Aircraft engines, such as gas turbine engines, include various pipes or tubes therein for directing air, fuel, oil or mixtures thereof to engine components. Threaded connections are often used between such tubes and the associated engine components. However, threaded connections are susceptible to loosening after assembly due to various factors, such as vibrations, impacts, or alternating thermal loads to name a few.

SUMMARY

In one aspect, there is provided a service tube assembly for an aircraft engine, comprising: a service tube extending along a tube axis and having a threaded end portion and an outer shoulder adjacent to the threaded end portion, the outer shoulder having a frustoconical shoulder face converging towards the tube axis and away from the threaded end portion; a mating part threadingly engaged by the threaded end portion of the service tube, the mating part having a seat face converging towards the service tube and towards the threaded end portion; a locking member extending from a first end to a second end, the first end including a notch receiving the outer shoulder of the service tube, the notch circumscribed by a frustoconical notch face abutting the frustoconical shoulder face to create a frustoconical-to-frustoconical contact surface between the locking member and the outer shoulder of the service tube, the second end in abutment against the seat face of the mating part; and a mechanical fastener releasably holding the locking member in abutment against both of the outer shoulder of the service tube and the mating part.

The service tube assembly described above may include any of the following features, in any combinations.

In some embodiments, the mechanical fastener has a shank extending through a bore defined in the locking member, the bore having a greater cross-section than that of the shank to provide for an annular gap between the shank and the locking member.

In some embodiments, the seat face of the mating part is a frustoconical inner face.

In some embodiments, the mechanical fastener is centered between the frustoconical shoulder face of the service tube and the seat face of the mating part.

In some embodiments, the frustoconical shoulder face and the seat face are symmetric when seen in a plane containing both of the tube axis and an axis of the mechanical fastener, a symmetry plane defined by the axis of the mechanical fastener.

In some embodiments, one or more of the frustoconical shoulder face of the outer shoulder and the frustoconical notch face has a textured finish.

In some embodiments, the mechanical fastener includes a threaded fastener threadingly engaged with the mating part, the threaded fastener torqued to compress the locking member against both of the seat face of the mating part and the frustoconical shoulder face of the outer shoulder of the service tube.

In some embodiments, the mechanical fastener includes a threaded fastener threadingly engaged with the mating part via a threaded insert, the threaded insert being self-locking.

In some embodiments, the mechanical fastener includes a bolt, the locking member loosely fitted on a shank of the bolt and retained thereon by a retaining clip.

In another aspect, there is provided a turbine exhaust case of an aircraft engine, comprising: an outer duct wall and an inner duct wall defining an annular gas path therebetween; a strut extending across the annular gas path; a service tube extending along a tube axis within the strut, the service tube having a threaded inner end portion and an outer shoulder adjacent to the threaded inner end portion, the outer shoulder having a frustoconical shoulder face converging towards the tube axis and away from the threaded inner end portion; a bearing housing disposed radially inwardly from the inner duct wall, the bearing housing having a threaded bore, the threaded inner end portion of the service tube threadingly engaged to the threaded bore, the bearing housing having a seat face converging towards the service tube and towards the threaded end portion; a locking member extending from a first end to a second end, the first end including a notch receiving the outer shoulder of the service tube, the notch circumscribed by a frustoconical notch face abutting the frustoconical shoulder face to create a frustoconical-to-frustoconical contact surface between the locking member and the outer shoulder of the service tube, the second end in abutment against the seat face of the bearing housing; and a mechanical fastener threadingly engaged to the bearing housing, the threaded fastener tightened to press the locking member against both of the frustoconical shoulder face and the seat face.

The turbine exhaust case described above may include any of the following features, in any combinations.

In some embodiments, the seat face of the bearing housing is a frustoconical inner face.

In some embodiments, the mechanical fastener has a shank extending through a central bore defined in the locking member, the central bore having a greater cross-section than that of the shank to provide for an annular gap between the shank and the locking member.

In some embodiments, the mechanical fastener is centered between the frustoconical shoulder face of the service tube and the seat face of the bearing housing.

In some embodiments, the frustoconical shoulder face and the seat face are symmetric when seen in a plane containing both of the tube axis and an axis of the mechanical fastener, a symmetry plane defined by the axis of the mechanical fastener.

In some embodiments, one or more of the frustoconical shoulder face of the outer shoulder and the frustoconical notch face has a textured finish.

In some embodiments, the mechanical fastener includes a threaded fastener threadingly engaged with the bearing housing, the threaded fastener torqued to compress the locking member against both of the seat face of the bearing housing and the frustoconical shoulder face of the outer shoulder of the service tube.

In some embodiments, the mechanical fastener includes a threaded fastener threadingly engaged with the bearing housing via a threaded insert, the threaded insert being self-locking.

In some embodiments, the mechanical fastener includes a bolt, the locking member loosely fitted on a shank of the bolt and retained thereon by a retaining clip.

In yet another aspect, there is provided a method of assembling a service tube to an engine component, the method comprising: threadingly engaging the service tube with the engine component; and locking the service tube against rotation relative to the engine component by tightening a locking member against an outer shoulder of the service tube thereby frictionally engaging an inner frustoconical face defined by a notch of the locking member with a frustoconical shoulder face of the service tube.

In some embodiments, the tightening includes tightening a mechanical fastener in a correspondingly threaded aperture defined in the engine component at a location generally centered between the frustoconical shoulder face of the service tube and a seat face defined by the engine component.

BRIEF DESCRIPTION OF THE DRAWINGS

Reference is now made to the accompanying figures in which:

FIG. 4 is a three dimensional view of the service tube assembly of FIG. 3 in an assembled configuration;

FIG. 5 is a three dimensional view of the service tube assembly of FIG. 3 in a partially assembled configuration;

FIG. 6 is a bottom three dimensional view of a locking member for the service tube assembly of FIG. 3.

DETAILED DESCRIPTION

The description is generally directed to systems, methods, and other devices related to routing fluid flow (e.g., air, oil, fuel or mixtures thereof) in an engine and, more particularly, to systems, methods and devices for securing a threaded connection between a service tube and an associated engine component or mating part. The mating part can be any features configured for connection to a service tube. For purposes of illustration, the technology will be described with respect to an aircraft gas turbine engine. It will be understood, however, that the technology is not so limited and may have general applicability in non-aircraft applications, such as other mobile applications and non-mobile industrial, commercial, and residential applications, including power generation. Furthermore, even though the following description and accompanying drawings specifically refer to an Auxiliary Power Unit (APU) as an example, it is understood that aspects of the present disclosure may be equally applicable to a wide variety of engines including all types of gas turbine (e.g., continuous combustion) engines, internal (e.g., intermittent) combustion engines, electric powerplants and hybrid powerplants to name a few. It should be further understood that while a particular embodiment is described in reference to a service tube within a strut of a turbine exhaust case, the features of the exemplified service tube assembly could be applied to other service tube assemblies within the engine or along the engine case.

The term "service tube" is herein intended to encompass any tube that can be used in an engine to route a fluid, such as air, oil, air/oil mixture, etc. to an engine component.

The terms "attached", "coupled", "connected" or "engaged" may include both direct attachment, coupling, connection or engagement (in which two components contact each other) and indirect attachment, coupling, connection or engagement (in which at least one additional component is located between the two components).

The terms "substantially" and "generally" as used herein may be applied to modify any quantitative representation which could permissibly vary without resulting in a change in the basic function to which it is related.

Aspects of various embodiments will now be described through reference to the drawings.

Figure 1:
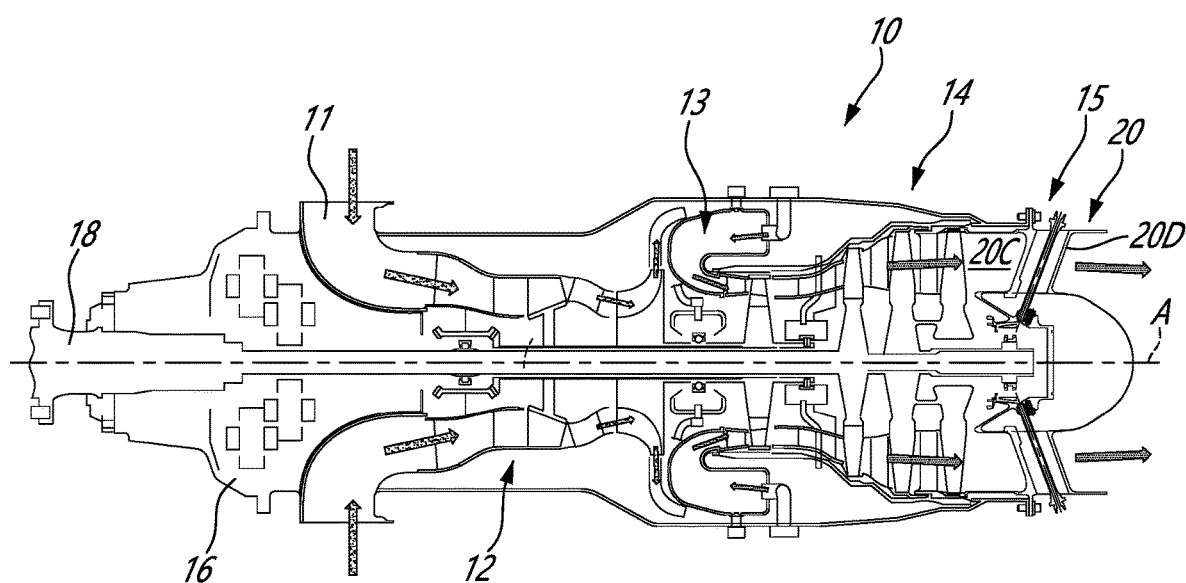
FIG. 1 is a schematic cross sectional view of an aircraft engine depicted as a gas turbine engine.

FIG. 1 illustrates a gas turbine engine 10 suitable for use as an APU and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the gas turbine engine 10. According to the illustrated exemplary engine, the turbine 14 is drivingly connected to an input end of a reduction gearbox RGB 16. The RGB 16 has an output end drivingly connected to an output shaft 18 configured to drive a rotatable load, such as a generator (not shown). The principles of the present disclosure may apply to any aircraft engine, such as turbofan, turboshaft, and turboprop.

Figure 2:
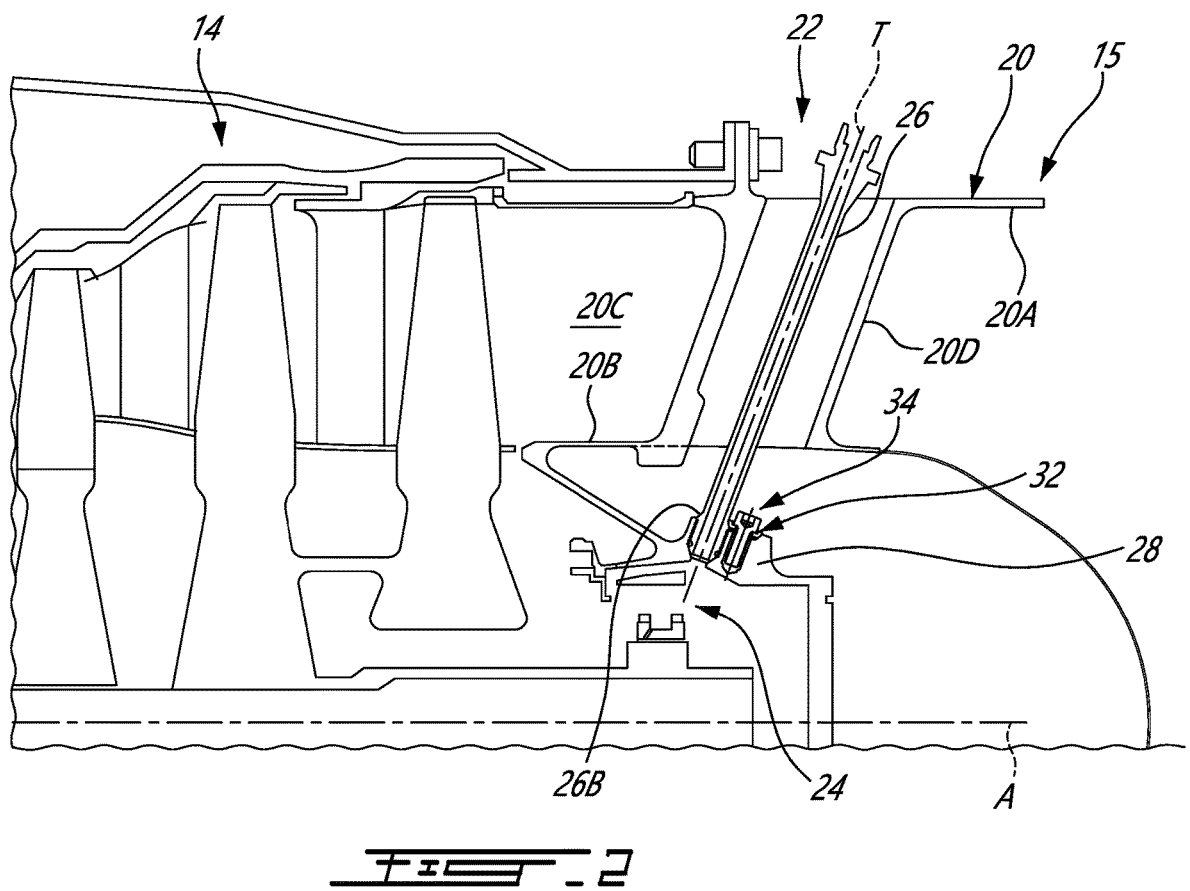
FIG. 2 is a schematic cross-sectional view of a turbine exhaust case of the gas turbine engine shown in FIG. 1.

Referring now to FIG. 2, in the depicted embodiment, the exhaust 15 comprises a turbine exhaust case 20 having an outer duct wall 20A and an inner duct wall 20B located radially-inwardly of the outer duct wall 20A and defining therebetween an annular gas path 20C extending about an engine axis A. The turbine exhaust case 20 further comprises a plurality of struts 20D circumferentially interspaced from one another about the engine axis A and extending generally radially across the annular gas path 20C from the outer duct wall 20A to the inner duct wall 20B, thereby structurally interconnecting the outer and inner duct walls 20A, 20B. The struts 20D may have an airfoil profile for directing the exhaust gases received from the turbine 14. A service tube assembly 22 may be disposed in a hollow interior of one or more of the struts 20D for feeding a service fluid, such as air, oil or an oil/air medium, to an engine component disposed radially inwardly of the annular gas path 20C. According to the illustrated embodiment, the service tube assembly 22 is used to provide oil to a bearing 24 mounted inside the turbine exhaust case 20 for supporting an aft end of a main rotor of the gas turbine engine 10 (e.g., the aft end of a low pressure spool). It will be appreciated that the service tube assembly 22 described in greater detail below may be used at many locations across the gas turbine engine 10.

Figure 3:
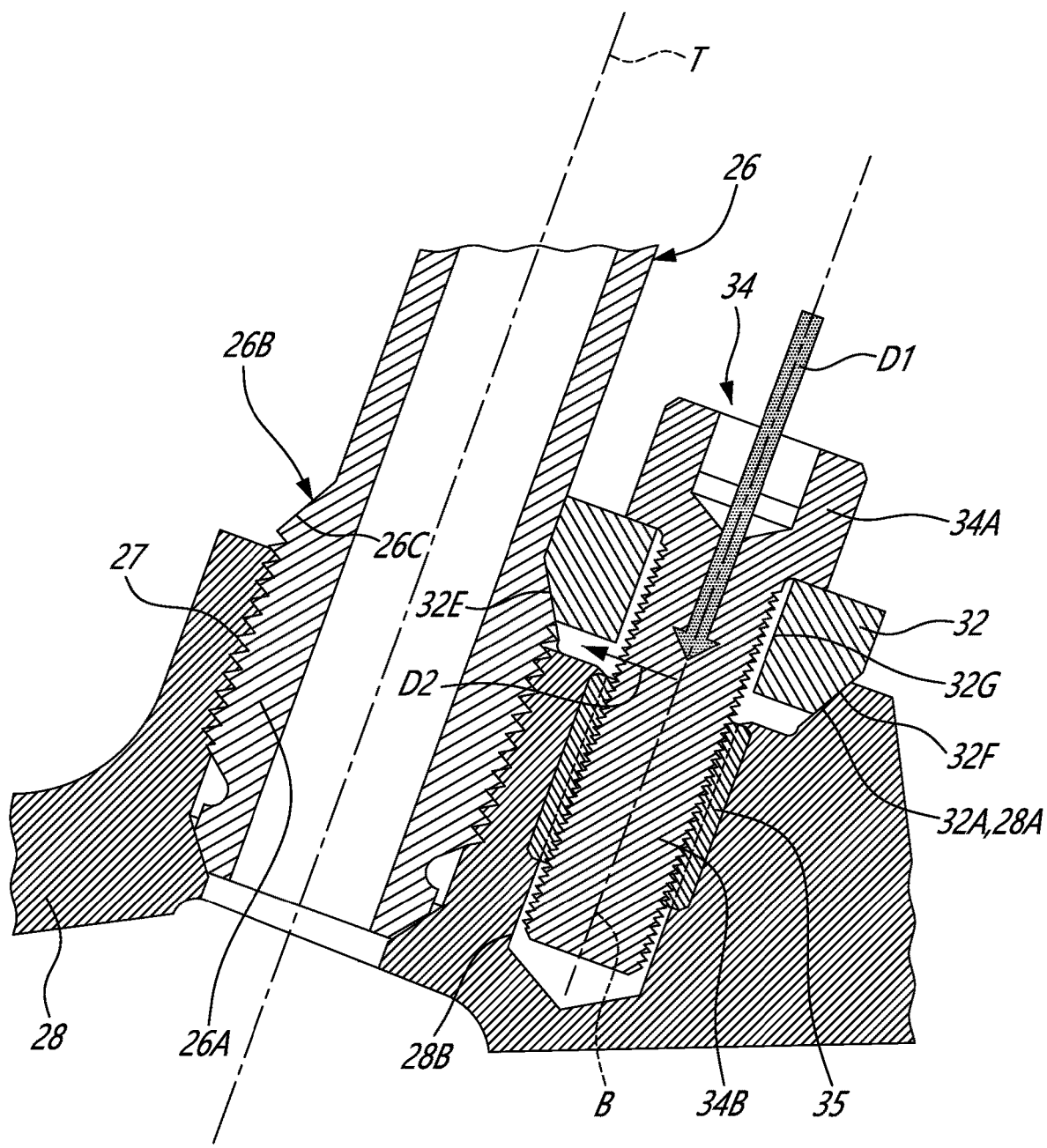
FIG. 3 is a cross-sectional view of a turbine exhaust case service tube assembly in accordance with one embodiment for the turbine exhaust case of FIG. 2.

Referring now to FIGS. 2 and 3, the service tube assembly 22 includes a service tube 26 extending along a tube axis T and having a threaded inner end portion 26A (FIG. 3) threadingly engaged to a correspondingly threaded bore 27 (FIG. 3) defined in an outer surface of a bearing housing 28 that contains the bearing(s) 24 (FIG. 2). The service tube 26 is tightened to a predetermined torque to compress a seal (not shown) in sealing engagement with a corresponding sealing surface circumscribing an inner end portion of the threaded bore 27 in the bearing housing 28.

Over time, such a threaded connection may become loose, which may result in oil leakage at the service tube 26 and bearing housing 28 interface. Moreover, because of radial space constraints, it may not be possible to introduce an anti-loosening/locking feature at the radially outer end of the service tube 26.

It is herein proposed to provide the service tube assembly 22 with an anti-loosening or locking structure to restrain the service tube 26, at its radially-inner end, against rotation after the same has been fastened to the specified torque. The anti-loosening structure generally comprises a locking member 32 engageable with both the service tube 26 and the bearing housing 28 to frictionally lock the service tube 26 against rotation relative to the bearing housing 28 as will be discussed below.

Referring more particularly to FIG. 3, the locking member 32 has an outer conical surface 32A configured to be firmly pressed against a mating/complementary conical seat jointly formed by an outer shoulder 26B on the service tube 26 and a seat face 28A, which is herein a frustoconical inner face, defined on an outer surface of the bearing housing 28. The conical shape of the mating surfaces contributes to maximize the friction surfaces between the components and, thus, may provide enhanced locking function.

The outer shoulder 26B is provided adjacent or next to the threaded inner end portion 26A of the service tube 26 so as to extend outwardly from the outer surface of the bearing housing 28 once the service tube 26 has been suitably tightened thereon. The outer shoulder 26B extends continuously around a full circumference of the service tube 26 and defines a frustoconical shoulder face 26C converging in a direction away from the threaded inner end portion 26A. In some embodiments, the outer shoulder 26B may be circumferentially discontinued and may include circumferential segments distributed about the tube axis T. The frustoconical shoulder face 26C converges towards the tube axis T and away from the threaded inner end portion 26A. The frustoconical shoulder face 26C is defined by a decrease in a diameter of the service tube 26 at its outer surface from the radially inner end towards the radially outer end. The service tube 26 therefore tapers towards its radially outer end.

Referring to FIGS. 3 and 5, the seat face 28A on the bearing housing 28 is positioned on a side of the threaded bore 27 so as to surround at least a portion of a circumference of the outer shoulder 26B of the service tube 26 when the same is installed on the bearing housing 28. The seat face 28A has a frustoconical profile with a cone angle corresponding to that of the frustoconical shoulder face 26C. In other words, the frustoconical shoulder face 26C and the seat face 28A diverge at the same rate from the outer surface of the bearing housing 28 so as to offer a uniform funnel-shaped seat for the locking member 32. Put differently, the seat face 28A converges radially towards the service tube 26 and axially towards the threaded inner end portion 26A relative to the tube axis T. It will be appreciated that, in another embodiment, the seat face 28A may not need to be curved and may be defined by a sloped flat face of the bearing housing 28.

Referring now to FIG. 4, the locking member 32 is described in greater detail. The locking member 32 has a body that extends from a first end 32B to a second end 32C. The first end 32B defines a notch 32D that is sized to receive at least a portion of the outer shoulder 26B of the service tube 26. The notch 32D may be shaped as a negative of a portion of the service tube 26. The notch 32D is circumscribed by a frustoconical notch face 32E that abuts the frustoconical shoulder face 26C of the service tube 26. Stated differently, the locking member 32 defines a concave frustoconical face that abuts a convex frustoconical face of the service tube 26. It will be appreciated that one or more of the frustoconical shoulder face 26C of the outer shoulder 26B and the frustoconical notch face 32E may have a textured finish (e.g., grooves, knurled, etc.) to increase friction between the two. Once installed, a frustoconical-to-frustoconical contact surface between the locking member 32 and the outer shoulder 26B of the service tube 26 is created. Friction between these two frustoconical surfaces may prevent the loosening of the service tube 26. The second end 32C of the locking member 32 abuts the seat face 28A of the bearing housing 28.

Referring to FIGS. 5-6, in the embodiment shown, the second end 32C of the locking member 32 defines an outer frustoconical face 32F that abuts the seat face 28A of the bearing housing 28. The outer frustoconical face 32F may define a shape complementary to that of the seat face 28A such that a contact surface is defined therebetween. It will be appreciated that one or both of the second end 32C of the locking member 32 and the bearing housing 28 may define a sloped face that induces a radial movement of the locking member towards the service tube 26 relative to the tube axis T as the locking member 32 is moved towards the bearing housing 28 as will be explained further below.

Referring back to FIG. 3, the locking member 32 is held in place secured to the bearing housing 28 via a mechanical fastener 34. The mechanical fastener 34 is here exemplified as a bolt having a head 34A in abutment against the locking member 32 and a shank 34B that extends through a bore 32G of the locking member 32 and that is threadingly engaged to a correspondingly threaded aperture 28B defined by the bearing housing 28. The mechanical fastener is thus releasably holding the locking member 32 in abutment against both of the outer shoulder 26B of the service tube 26 and the bearing housing 28. The mechanical fastener 34 may be torqued to compress the locking member 32 against both of the seat face 28A of the bearing housing 28 and the frustoconical shoulder face 26C of the outer shoulder 26B of the service tube 26.

The bore 32G of the locking member 32 has a greater cross-section than that of the shank 34B of the mechanical fastener 34 to provide an annular gap between the shank 34B and the locking member 32. In other words, an inner diameter of the locking member 32 at the bore 32G is greater than an outer diameter of the shank 34B of the mechanical fastener 34. This annular gap may allow radial movements of the locking member 32 relative to the tube axis T and relative to the shank 34B as the locking member 32 sits in contact against both of the outer shoulder 26B and the seat face 28A of the bearing housing 28. This may allow a uniform pressure distribution on both frustoconical faces, that are, the frustoconical shoulder face 26C and the seat face 28A, as the locking member 32 is bolted down with the mechanical fastener 34. The mechanical fastener 34 may therefore be generally centered between the frustoconical shoulder face 26C of the service tube 26 and the seat face 28A of the bearing housing 28. The expression "generally" is meant to encompass slight deviations caused by manufacturing tolerances, for instance. The frustoconical shoulder face 36C and the seat face 28A are herein symmetric when seen in a plane containing both of the tube axis T and an axis B of the mechanical fastener 34 (the view of FIG. 3 represents such a plane). A symmetry plane is thus defined by the axis B of the mechanical fastener 34.

In use, as the mechanical fastener 34 is threaded into the threaded aperture 28B, the head 34A abuts and pushes against the locking member 32 along direction D1, which becomes in abutment against the seat face 28A at the second end 32C and in abutment against the frustoconical shoulder face 26C at the first end 32B. Further tightening of the mechanical fastener 34 causes the outer frustoconical face 32F of the locking member 32 to slide against the seat face 28A as the locking member 32 is pushed towards the bearing housing 28. This movement induces a lateral (to the left in FIG. 3) or radial movement of the locking member 32 towards the service tube 26 along direction D2 thereby increasing a pressure force between the frustoconical notch face 32E and the frustoconical shoulder face 26C of the service tube 26. This pressure force creates a frictional engagement between the two components that impedes rotation of the service tube 26 about the tube axis T. This lateral movement is allowed at least partially by the annular gap between the shank 34B and the bore 32G of the locking member 32. In some configurations, this annular gap may be omitted. The annular gap may allow tolerances to be loosened when manufacturing the locking member 32.

Still referring to FIG. 3, in the embodiment shown, a threaded insert 35 is threadingly engaged into the threaded aperture 28B of the bearing housing 28. The threaded insert 35 has outer threads threadingly engaged to inner threads of the threaded aperture 28B and has inner threads threadingly engaged by the threads of the shank 34B of the mechanical fastener 34. The threaded insert 35 may be a self-locking insert.

Referring now to FIGS. 5-6, in the depicted embodiment, the locking member 32 is loosely fitted on the shank 34B and retained thereon by a retaining clip 36. This may ease assembly of the locking member 32 as the mechanical fastener 34 and the locking member 32 may be inserted through the strut 20D of the turbine exhaust case 20 without risking of the locking member 32 falling off the mechanical fastener 34.

Figure 7:
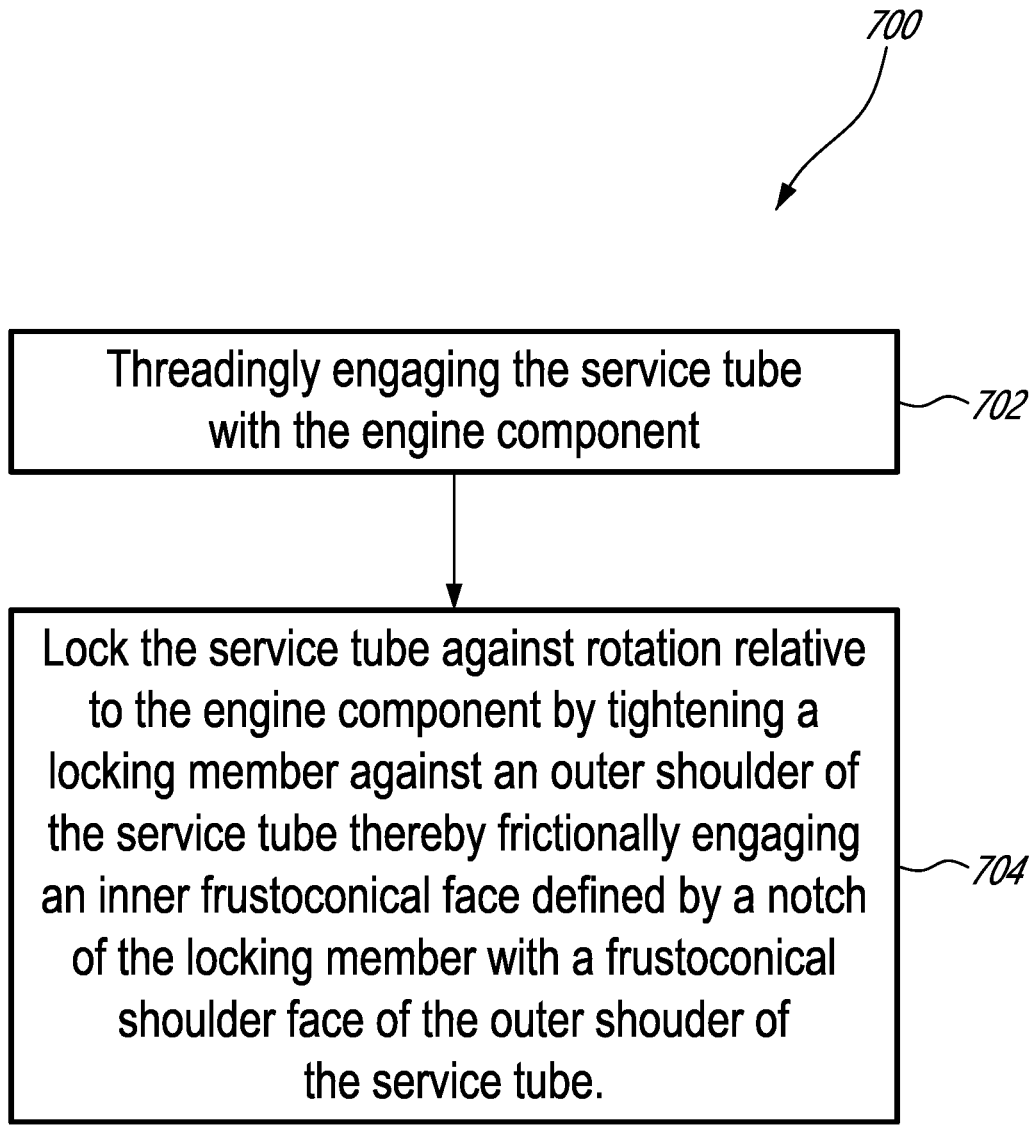
FIG. 7 is a flowchart illustrating steps of a method of assembling a service tube to an engine component.

Referring now to FIG. 7, a method of assembling the service tube 26 to the engine component, such as the bearing housing 28, is shown at 700. The method 700 includes threadingly engaging the service tube 26 with the engine component at 702; and locking the service tube 26 against rotation relative to the engine component by tightening the locking member 32 against the outer shoulder 26B of the service tube 26 thereby frictionally engaging the frustoconical notch face 32E defined by the notch 32D of the locking member 32 with a frustoconical shoulder face 26C of the outer shoulder 26B of the service tube 26 at 704.

In the embodiment shown, the tightening includes tightening the mechanical fastener 34 in a correspondingly threaded aperture 28B defined in the bearing housing 28 at a location generally centered between the frustoconical shoulder face and the seat face 28A defined by the bearing housing 28.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A service tube assembly for an aircraft engine, comprising:
    a service tube extending along a tube axis and having a threaded end portion and an outer shoulder adjacent to the threaded end portion, the outer shoulder having a frustoconical shoulder face converging towards the tube axis and away from the threaded end portion;
    a mating part threadingly engaged by the threaded end portion of the service tube, the mating part having a seat face converging towards the service tube and towards the threaded end portion;
    a locking member extending from a first end to a second end, the first end including a notch receiving the outer shoulder of the service tube, the notch circumscribed by a frustoconical notch face abutting the frustoconical shoulder face to create a frustoconical-to-frustoconical contact surface between the locking member and the outer shoulder of the service tube, the second end in abutment against the seat face of the mating part; and
    a mechanical fastener releasably holding the locking member in abutment against both of the outer shoulder of the service tube and the mating part.

2. The service tube assembly of claim 1, wherein the mechanical fastener has a shank extending through a bore defined in the locking member, the bore having a greater cross-section than that of the shank to provide for an annular gap between the shank and the locking member.

3. The service tube assembly of claim 1, wherein the seat face of the mating part is a frustoconical inner face.

4. The service tube assembly of claim 1, wherein the mechanical fastener is centered between the frustoconical shoulder face of the service tube and the seat face of the mating part.

5. The service tube assembly of claim 4, wherein the frustoconical shoulder face and the seat face are symmetric when seen in a plane containing both of the tube axis and an axis of the mechanical fastener, a symmetry plane defined by the axis of the mechanical fastener.

6. The service tube assembly of claim 1, wherein one or more of the frustoconical shoulder face of the outer shoulder and the frustoconical notch face has a textured finish.

7. The service tube assembly of claim 1, wherein the mechanical fastener includes a threaded fastener threadingly engaged with the mating part, the threaded fastener torqued to compress the locking member against both of the seat face of the mating part and the frustoconical shoulder face of the outer shoulder of the service tube.

8. The service tube assembly of claim 1, wherein the mechanical fastener includes a threaded fastener threadingly engaged with the mating part via a threaded insert, the threaded insert being self-locking.

9. The service tube assembly of claim 1, wherein the mechanical fastener includes a bolt, the locking member loosely fitted on a shank of the bolt and retained thereon by a retaining clip.

10. A turbine exhaust case of an aircraft engine, comprising:
    an outer duct wall and an inner duct wall defining an annular gas path therebetween;
    a strut extending across the annular gas path;
    a service tube extending along a tube axis within the strut, the service tube having a threaded inner end portion and an outer shoulder adjacent to the threaded inner end portion, the outer shoulder having a frustoconical shoulder face converging towards the tube axis and away from the threaded inner end portion;
    a bearing housing disposed radially inwardly from the inner duct wall, the bearing housing having a threaded bore, the threaded inner end portion of the service tube threadingly engaged to the threaded bore, the bearing housing having a seat face converging towards the service tube and towards the threaded end portion;
    a locking member extending from a first end to a second end, the first end including a notch receiving the outer shoulder of the service tube, the notch circumscribed by a frustoconical notch face abutting the frustoconical shoulder face to create a frustoconical-to-frustoconical contact surface between the locking member and the outer shoulder of the service tube, the second end in abutment against the seat face of the bearing housing; and a mechanical fastener threadingly engaged to the bearing housing, the threaded fastener tightened to press the locking member against both of the frustoconical shoulder face and the seat face.

11. The turbine exhaust case of claim 10, wherein the seat face of the bearing housing is a frustoconical inner face.

12. The turbine exhaust case of claim 10, wherein the mechanical fastener has a shank extending through a central bore defined in the locking member, the central bore having a greater cross-section than that of the shank to provide for an annular gap between the shank and the locking member.

13. The turbine exhaust case of claim 10, wherein the mechanical fastener is centered between the frustoconical shoulder face of the service tube and the seat face of the bearing housing.

14. The turbine exhaust case of claim 13, wherein the frustoconical shoulder face and the seat face are symmetric when seen in a plane containing both of the tube axis and an axis of the mechanical fastener, a symmetry plane defined by the axis of the mechanical fastener.

15. The turbine exhaust case of claim 10, wherein one or more of the frustoconical shoulder face of the outer shoulder and the frustoconical notch face has a textured finish.

16. The turbine exhaust case of claim 10, wherein the mechanical fastener includes a threaded fastener threadingly engaged with the bearing housing, the threaded fastener torqued to compress the locking member against both of the seat face of the bearing housing and the frustoconical shoulder face of the outer shoulder of the service tube.

17. The turbine exhaust case of claim 10, wherein the mechanical fastener includes a threaded fastener threadingly engaged with the bearing housing via a threaded insert, the threaded insert being self-locking.

18. The turbine exhaust case of claim 10, wherein the mechanical fastener includes a bolt, the locking member loosely fitted on a shank of the bolt and retained thereon by a retaining clip.

* * * * *